R. L. WILCOX.
BIFURCATING MACHINE.
APPLICATION FILED MAY 11, 1908.
955,373.
Patented Apr. 19, 1910.
5 SHEETS—SHEET 5.
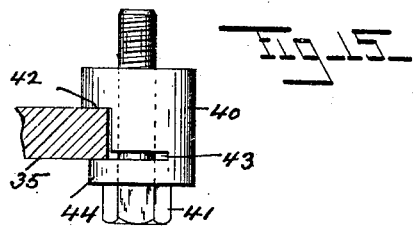
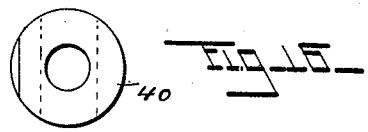
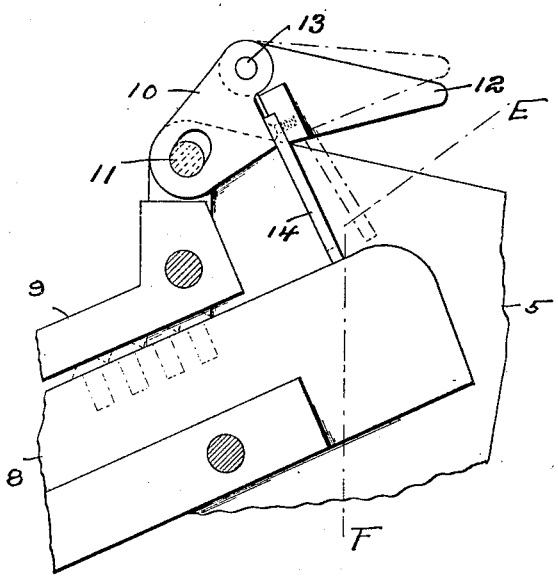
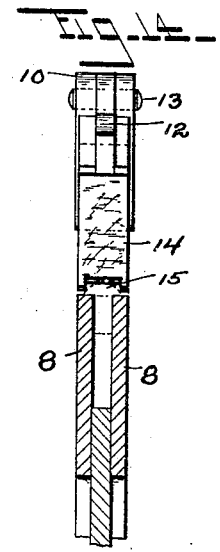
WITNESSES:
INVENTOR.
R Lester Wilcox
BY
ATTORNEY.

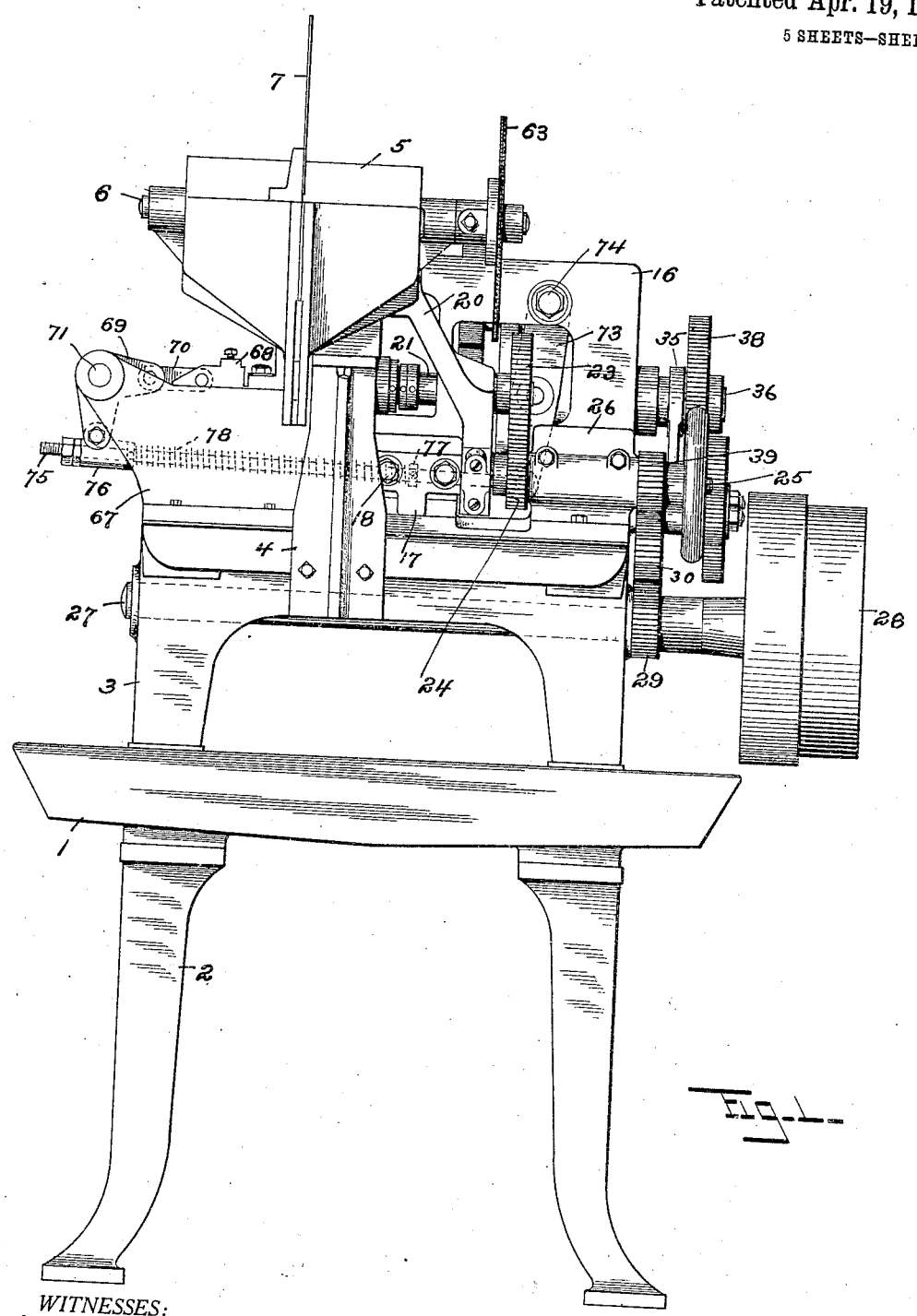

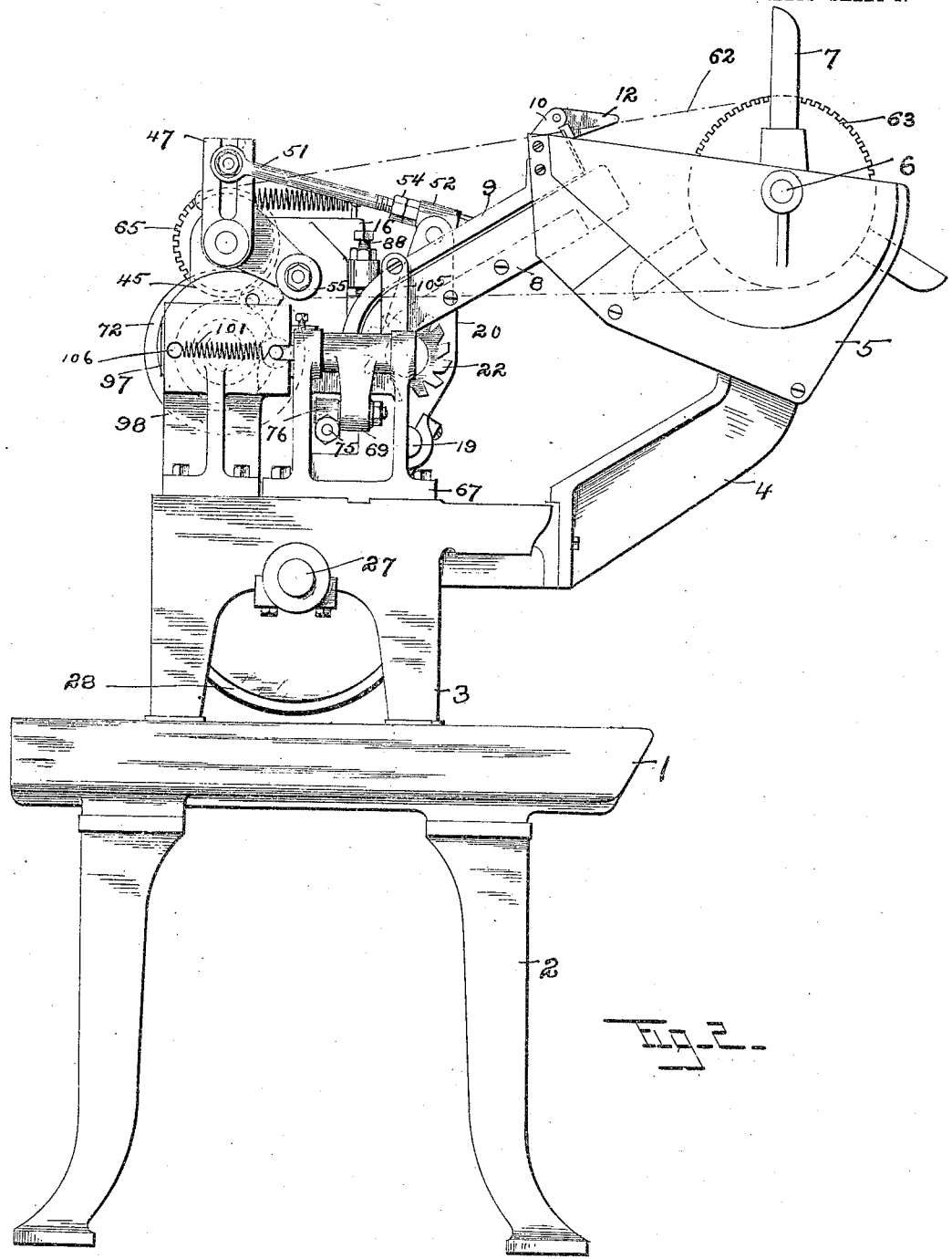

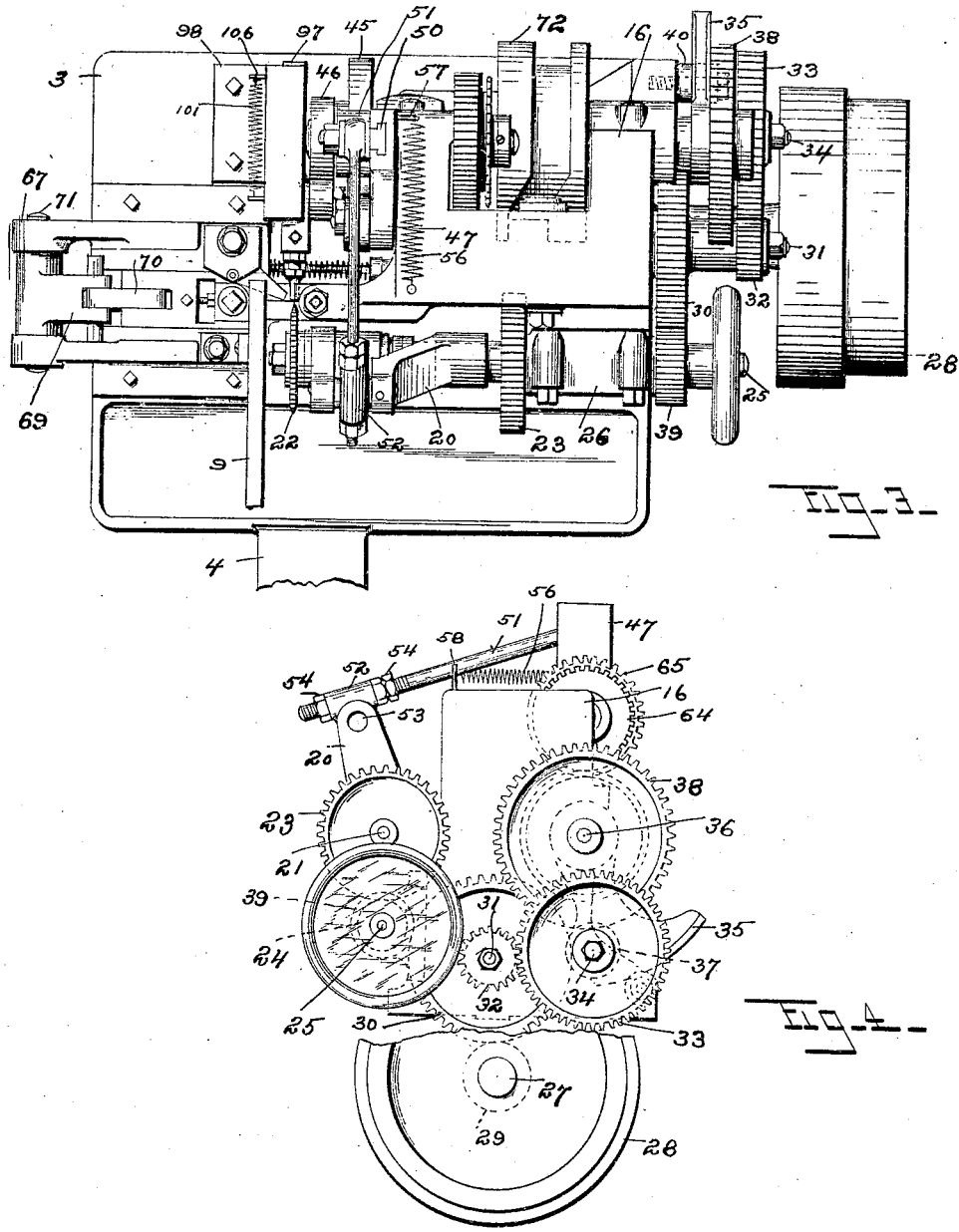

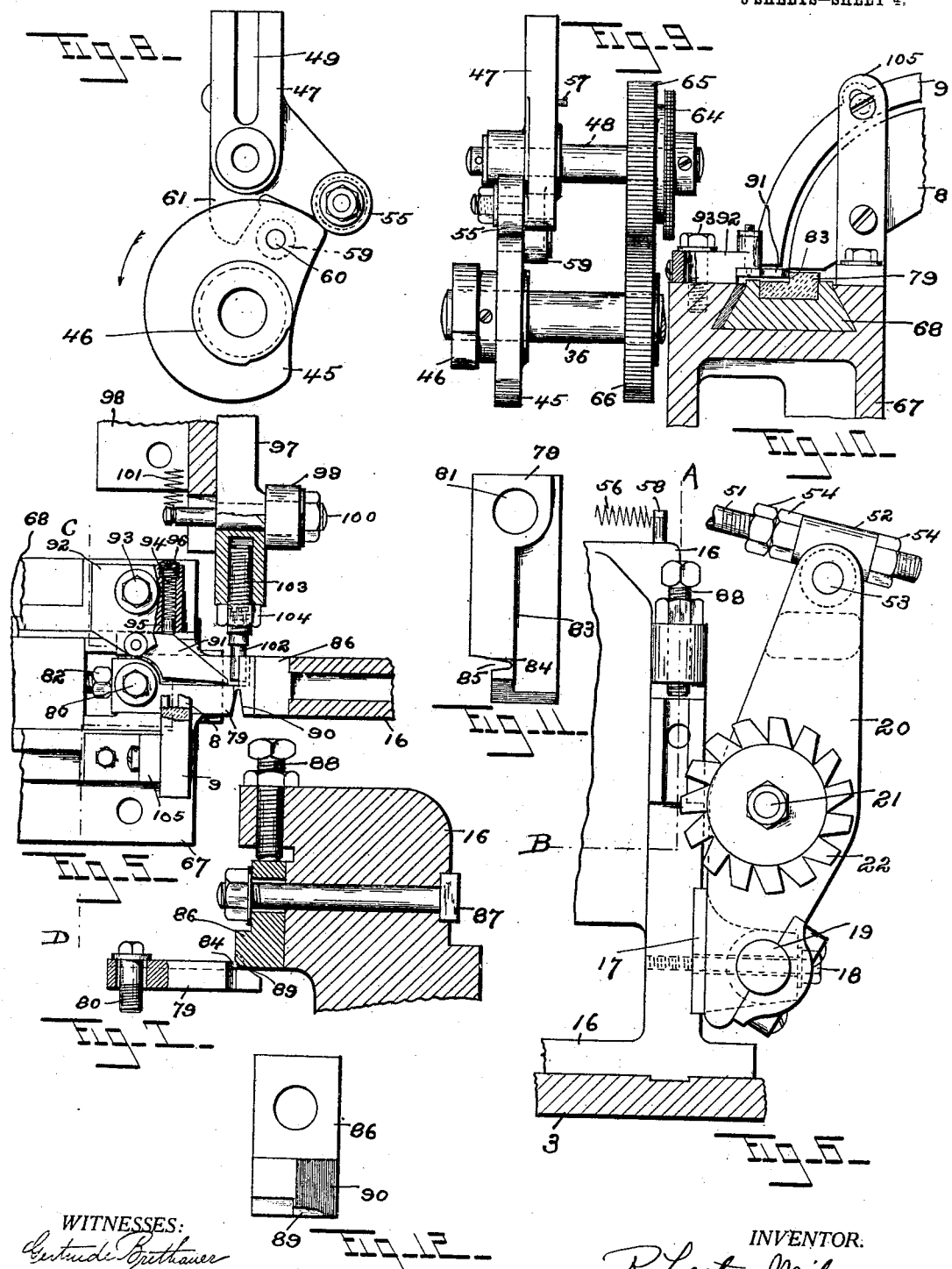
R. L. WILCOX.
BIFURCATING MACHINE.
APPLICATION FILED MAY 11, 1908.
955,373. Patented Apr. 19, 1910.
5 SHEETS—SHEET 4.

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

BIFURCATING-MACHINE.

955,373.   Specification of Letters Patent.   Patented Apr. 19, 1910.

Application filed May 11, 1908. Serial No. 432,176.

*To all whom it may concern:*

Be it known that I, RICHARD LESTER WILCOX, a citizen of the United States, residing at Waterbury, in the county of New Haven and State of Connecticut, have invented certain new and useful Improvements in Bifurcating-Machines, of which the following is a specification, reference being had therein to the accompanying drawings.

My invention relates to new and useful improvements in bifurcating machines, having for its object, among other things, to provide a machine that will perform work of this character with means for delivering an uninterrupted flow of blanks successively and automatically onto the holding devices that rigidly grip the blanks while being operated on; means to prevent the endwise movement of the blank in the holding devices during the sawing operation; means for alining the blanks before the same are presented to the saw mechanism; means for stripping the blanks from the holding devices after the sawing operation; and means for insuring the positive withdrawal of the saw from the blank if some of the operative parts should break, or become inoperative for other reasons; and to produce these, and other desirable features, with mechanism composed of few parts, so designed as to be economically constructed and readily assembled.

To these, and other ends, my invention consists in the bifurcating machine, having certain details of construction and combinations of parts as will be hereinafter described and more particularly pointed out in the claims.

Referring to the drawings, in which like numerals of reference designate like parts in the several figures: Figure 1 is a front elevation of my improved bifurcating machine complete; Fig. 2 is an end elevation looking from the left of Fig. 1; Fig. 3 is a plan view with the hopper mechanism removed; Fig. 4 is a partial end elevation looking from the right of Fig. 1; Fig. 5 is an enlarged plan view of the holding mechanism with the parts adjacent thereto; Fig. 6 is an enlarged end elevation of the saw mechanism and the frame; Fig. 7 is an enlarged fragmentary elevation of a portion of the saw frame upon line A—B of Fig. 6 with the movable die and fixed die in the relative positions occupied by them during the sawing operation; Fig. 8 is an end elevation of the mechanism for actuating the saw frame; Fig. 9 is a front elevation of the parts shown in Fig. 8 with some of the parts adjacent thereto; Fig. 10 is a sectional end elevation of the holding mechanism upon line C—D of Fig. 5; Fig. 11 is an enlarged plan view of the movable die; Fig. 12 is an elevation of the holding die; Fig. 13 is a side elevation of the hopper agitator; Fig. 14 is a front elevation thereof with the sectional parts upon line E—F of Fig. 13; Fig. 15 is a plan view of the split collar for securing the gear sector in its adjusted positions; Fig. 16 is a front elvation thereof; Fig. 17 is a view of a bifurcated rivet blank, the product of my improved machine; and Fig. 18 is a view of another form of a rivet blank with the sides near the end flattened instead of bifurcated, as shown in the last figure.

In the drawings the numeral 1 designates the bed, 2 the legs, 3 the table secured to the top of the bed, and 4 the bracket for supporting the hopper mechanism, which may be of any preferred construction, but as shown herein consists of the receptacle 5 having a shaft 6 therein carrying the radial arms 7 which, during their rotation, sweep through the receptacle and the mass of blanks lying therein, lifting some of them onto the chute, which consists of the side pieces 8, rail 9 and bracket 105. The blanks are designed to pass between the side plates 8 with the head resting upon the top thereof, as shown in Fig. 13, but occasionally they will be delivered crosswise thereon, in which case the device would become clogged but for the agitating device which I have applied, that will sweep all rivets from the chute that are not in their proper relative position therewith. This device consists of a bracket arm 10, adjustably held by the screw 11 between the sections of the receptacle 5, and having a finger holder 12 pivotally secured thereto by the pintle 13 and carrying a fixed finger 14, the bottom edge of which will be just above the top of the side plates 8 when the parts are at rest. In Fig. 13 this mechanism is shown in its rest position by full lines when the heads of the blanks will pass through the notch 15 in the end of the finger 14. After each arm 7 passes the chute during its rotation the end thereof contacts with the end of the finger holder 12 and moves it so that it occupies the position shown by broken lines in Fig. 13, during which time the finger 14 sweeps over the ends of the side plates 8 knocking off from said chute all the blanks that are not in their proper positions, gravity returning the finger to its rest position.

Fixed to the table 3 is the frame 16 having mounted thereon the block 17 which is secured thereto by bolts 18 that pass through holes in said block of slightly larger diameter than that of said bolts, as shown by the dotted lines in Fig. 6, so as to permit a limited horizontal adjustment of said block. Movably mounted upon the trunnions 19, integral with said block, is the saw frame 20 carrying the saw arbor 21, to which the saw 22 is secured at one end and the gear 23 at the other end which meshes into and is driven by a pinion 24 fixed on a shaft 25 rotatably mounted in a block 26 secured to the frame 16.

Journaled in the table 3 is the main driving shaft 27 which is driven through the pulleys 28 and having a pinion 29 thereon which meshes into and drives a gear 30 rotatable upon a stud 31 fixed in the side of the frame 16, which gear meshes into and drives the pinion 39 fixed on the shaft 25. Connected with the gear 30 is the pinion 32 which meshes into and drives a gear 33 rotatable upon a stud 34 fixed in the sector arm 35 which is loosely mounted upon the shaft 36 journaled in the frame 16, and which shaft is rotated from the pinion 37 upon the stud 34 that meshes into and drives a gear 38 fixed on said shaft 36. To change the relative speed of rotation of the shaft 36 to that of the shaft 27, gears of varying diameters may be substituted for gear 33, and to insure the intermeshing of the teeth of these gears with the teeth of the pinion 32, the sector 35 is shiftable about the axis of the shaft 36 and held in any of its adjusted positions by the clamp collar 40 which is secured to the frame 16 by the bolt 41. This collar is grooved upon one side at 42 the width of the sector 35 (see Fig. 15) and the bottom of the groove provided with a slot 43. The sector 35 is held rigid by the screw 41, the head of which impinges against the collar 40 and holds the overhanging lip 44 thereon with such friction against the side of the sector 35 as to prevent its movement therein.

The mechanism for operating the saw frame comprises the cam 45 fixed to the shaft 36 preferably integral with the cam 46, rock arm 47 loosely mounted upon a stud 48 fixed in the frame 16, and having a slot 49 therein, within which is adjustably secured the block 50 connected to one end of the rod 51, the other end of which passes through a block 52 pivotally mounted on the saw frame by the pintle 53. The relative position of the saw frame and rock arm 47 is varied by means of the nuts 54 threaded on the rod 51. Rotatable upon the rock arm 47 is the roll 55 which is held normally against the periphery of the cam 45 by the spring 56 which is secured to the pin 57 in the arm 47 and to the pin 58 fixed in the frame 16. During the rotation of the shaft 36 a rocking movement is imparted to the saw frame through the cam 45, rock arm 47 and rod 51.

While I prefer to have the roll held in contact with the cam 45 by the tension of the spring 56, yet I have provided means for actuating the same positively if perchance this spring should break, which means comprises the roll 59 rotatable on the stud 60 fixed in the cam 45, which will engage the trip arm 61 upon the rock arm 47 and thereby positively actuate the same. The relative position of the roll 59 with the arm 61, when the rock arm 47 is being actuated by the spring 56, is such that the roll does not contact with said arm, but does if the spring should break.

Rotatably mounted upon the stud 48 is a gear 65 that is driven from a gear 66 on the shaft 36 (Fig. 9), and to which is fixed the sprocket wheel 64 connected by the sprocket chain 62 with the sprocket wheel 63 upon the shaft 6 of the hopper mechanism.

Secured to the table 3 is the standard 67 having movable therein the slide 68 which is connected with the rock sleeve 69 by a link 70, said rock sleeve 69 being mounted upon a pin 71 and actuated from the cam 72 fixed on the shaft 36 through the lever 73 connected to the frame 16 by the stud 74 and the rod 75 connected at one end to the lever 73, as shown by broken lines in Fig. 1 and at the other end to the rock sleeve 69 by a pivotally mounted block 76. Surrounding the rod 75 between the collar 77 fixed thereon and the block 76 is a coil spring 78 which exerts sufficient tension against said block to normally actuate said rock sleeve when all of the parts are running smoothly, but if perchance any portion of the slide mechanism should become clogged the spring will be compressed during the movement of the lever 73 and the parts will remain at rest.

Fixed upon the slide 68 by the screw 80 is the movable die 79 which has a slight adjustment in the direction of its length by reason of the body of the screw 80 being of slightly less diameter than the hole 81 in said die and is held against movement in one direction on said slide in any of its adjusted positions by the set screw 82 that is threaded into said slide with the head thereof against the end of said die. This die 79 is cut away upon one side parallel to its length so as to form the shoulder 83, and near the front end is provided with a crosswise notch 84 of substantially the same depth as the diameter of the blank, and extending inwardly from the side thereof is a slot 85 of substantially the same shape as the cross section of the saw tooth.

The fixed die 86 is adjustably connected with the frame 16 by the bolt 87 and the screw 88 which is threaded through a lug upon said frame with the end thereof impinging against the top of said die. This die is provided with a notch 89 of a size and shape similar to the notch 84 and is opposite thereto when the movable die is in its innermost position, and the front edge of said die is beveled at 90 to correspond in size and shape with the slot 85 in the movable die (Fig. 5).

In operation when the slide 68 is in its retracted position the notch 84 in the movable die 79 is below the end of the hopper chute and the blank drops therefrom into said notch with the underside of the head against the shoulder 83. The slide carrying the blank now moves forward until the blank engages the notch 89 in the fixed die where it is securely held between the walls of the notches 84 and 89, during the sawing operation, after which the slide is withdrawn. To insure the positive alinement of the successive blanks upon the movable slide, with their heads against the shoulder 83, and to strip the same therefrom after the sawing operation, I have provided a device which consists of the finger 91 pivotally connected with a block 92 fixed on the standard 67 by the bolt 93, and normally held with its front end against the shoulder 83 by a spring 94 lying in the block 92 between the slidable plug 95 and the screw plug 96 threaded into the block 92 and by its rotation therein capable of varying the tension of said spring. During the action of the movable die 79 from its retracted to its forward position the spring pressed finger 91 will move the blank on said die so that the underside of the head will engage the shoulder 83, and with the blanks in such position, will engage the fixed die. After the sawing operation, and during the return movement of the slide, the end of said finger will engage the head of the blank and knock it from the movable die, when it will fall by gravity into a receptacle conveniently arranged to receive it. The blanks are held against crosswise movement between the dies, during the sawing operation, by a mechanism that consists of a slide 97 movable within a bracket 98 fixed to the table 3, a roll 99 mounted upon a stud 100 fixed in said slide and held against the cam 46 by a spring 101 secured between the stud 100 and pin 106 on the bracket 98, and a pin 102 held within said slide by the screw 103 and having the jam nut 104 thereon. After the blank has been brought to a position where it is held between the two dies the cam 46 actuates the slide 97 so that the end of the pin 102 engages the head of the blank and is held in contact therewith during the sawing operation, after which the slide 97 and pin 102 are withdrawn by the spring 101. The endwise position of the pin 102 within the slide 97 is variable, so as to accommodate heads of different thicknesses, by the screw 103, and the jam nut 104 holds it against slipping in its adjusted positions.

In operation the blanks are thrown into the hopper indiscriminately, from which they are automatically delivered separately to the movable die from the chute and are then held rigidly for substantially the whole length of the blank between the two dies against endwise or lateral movement during the sawing operation and during the return movement of the die are stripped therefrom.

In this specification the slot in the blank is shown and described as being cut substantially the whole length of the body thereof, but it is apparent that the slot may be shorter in length or the sides of said body may be flattened, as shown in Fig. 18, by using two or more saws upon the arbor instead of one, and without affecting the mechanism or operation thereof, the blank may be operated upon in many other ways.

There are minor changes and alterations that can be made within my invention aside from those herein suggested, and I would therefore have it understood that I do not limit myself to the exact construction herein shown and described, but claim all that falls fairly within the spirit and scope of my invention.

Having described my invention, what I claim as new and desire to secure by Letters Patent, is,—

1. In a machine of the character described, the combination with a movable die having a shoulder upon one side thereof; a notch in said die at substantially a right angle to said shoulder and extending to the side of the die; means for delivering blanks onto said die with their heads against said shoulder; means contacting with said blank for holding the blank head against said shoulder during the movement of said dies; a fixed die having a notch therein of a size and shape similar to the notch in the movable die; and a reciprocating part actuated so as to bear against the head of the blank held between said notches when said movable die is at rest in its forward position.

2. In a machine of the character described, the combination with a fixed die; of a movable die having a shoulder and a crosswise notch therein; means for delivering blanks onto said movable die; and means for moving the blank upon said die so that the underside of the head thereof abuts against the said shoulder.

3. In a machine of the character described, the combination with a movable die; having a shoulder thereon; of means for alining blanks thereon during its movement in one direction, comprising a yieldingly mounted finger that holds the heads of said blanks against said shoulder.

4. In a machine of the character described, the combination with a movable die; of a fixed die; and means for alining the blanks upon said movable die during the movement thereof in one direction and stripping the blanks from the said die while the same is being moved in the opposite direction, said means comprising a finger lying against a part upon said movable die and pivotally mounted to a fixed part.

5. In a machine of the character described, the combination with a movable die; of a fixed die, said dies having notches therein which are opposite each other, and designed to hold a blank therebetween, when said movable die is in its forward position; a member movable in a path at substantially a right angle to said dies, in substantially the same horizontal plane as the said notches, and in one of its positions contacting with the head of said blank; a tool for operating upon the shank end of said blank; means for imparting movement to said member toward and away from said dies and hold the same in contact with said blank head during the operation of the tool upon the shank end thereof.

6. In a machine of the character described, the combination with a movable die having means thereon for carrying a blank during its movement in one direction; of a fixed die, said dies having notches therein which are opposite each other when said movable die is in its forward position; a reciprocating member movable in a path at substantially a right angle to said dies, in substantially the same horizontal plane as the said notches and in one of its positions contacting with said blank; a blank holding receptacle; and means for delivering blanks from said receptacle to the blank carrying means on said movable die.

7. In a machine of the character described, the combination with blank holding means, comprising a fixed die, and a movable die, that holds said blank against lateral movement, and a reciprocating member that holds said blank against endwise movement; of a saw frame having a saw rotatably mounted therein; a rock arm; means for positively actuating said rock arm in one direction; spring means for moving it in the opposite direction; and a connection between said saw frame and rock arm, said connection being adjustably secured to said frame in the direction of its length and adjustably secured to said rock arm toward and away from the center thereof.

8. In a machine of the character described, the combination with the holding means; of a saw frame upon one side of said holding means having a saw rotatably mounted therein; a cam actuated rock arm upon the opposite side of said holding means having a radial slot therein, for imparting movement to said saw frame; spring means for holding said rock arm against said cam; a connection between said rock arm and saw frame; means for adjustably securing said connection to said frame; and means for adjustably securing said connection within the radial slot in said rock arm.

9. In a machine of the character described, the combination with the holding means; of a saw frame having a rotary saw mounted therein; a rotary cam; a rock arm actuated by said cam; a connection between said rock arm and saw frame; spring means for holding said rock arm in engagement with said cam; and auxiliary means for actuating said rock arm, comprising a laterally projecting part upon said cam adapted to engage a depending member upon said rock arm.

10. In a machine of the character described, the combination with the holding means; of a saw frame having a rotary saw mounted therein; a rotary cam; a rock arm actuated by said cam; a connection between said rock arm and saw frame; means for holding said rock arm in engagement with said cam; and auxiliary means connected with said cam and coöperating with said rock arm to actuate said rock arm.

11. In a machine of the character described, the combination with holding means; of a pivotally mounted saw frame having a saw mounted therein; a cam; a rock arm actuated by said cam, the axes of the pivot mounting of said saw frame, cam and rock arm being substantially parallel with each other; a connection between said rock arm and saw frame; spring means for holding said rock arm in engagement with said cam; and auxiliary means for positively actuating said rock arm.

12. In a machine of the character described, the combination with blank holding means; of a saw frame pivotally mounted at one end and having a saw mounted therein; means connected with a rotary part for imparting a rocking movement to said saw frame; means for adjusting said rocking means whereby said saw frame will move through varying arcs; and means for shifting the position of the free end of said saw frame, whereby the center of the arc through which said saw frame travels may be shiftable toward and away from said holding means.

13. In a machine of the character described, the combination with blank holding means; of a pivotally mounted saw frame having a saw mounted therein; a rotary part; a rock arm actuated thereby; a connecting member between said rock arm and saw frame for swinging said saw frame upon its pivot mounting and imparting the movement of said rock arm thereto; means for adjustably securing said connection at one end to vary the relative positions of the free end of said saw frame and rock arm; and means for securing said connection at its other end to vary the length of said rocking movement.

In testimony whereof I affix my signature in presence of two witnesses.

R. LESTER WILCOX.

Witnesses:
J. M. GALLORD,
M. J. NOONAN.